(12) United States Patent
van Riel et al.

(10) Patent No.: US 8,479,256 B2
(45) Date of Patent: *Jul. 2, 2013

(54) MERGING MANDATORY ACCESS CONTROL (MAC) POLICIES IN A SYSTEM WITH MULTIPLE EXECUTION CONTAINERS

(75) Inventors: Henri H. van Riel, Nashua, NH (US); Daniel J. Walsh, Marlborough, MA (US); Warren I. Togami, Jr., Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 844 days.

This patent is subject to a terminal disclaimer.

(21) Appl. No.: 12/324,677

(22) Filed: Nov. 26, 2008

(65) Prior Publication Data

US 2010/0132012 A1 May 27, 2010

(51) Int. Cl.
*G06F 9/00* (2006.01)
*G06F 17/30* (2006.01)

(52) U.S. Cl.
USPC ........ 726/1; 726/2; 726/26; 726/27; 707/783; 707/828; 707/829

(58) Field of Classification Search
USPC .. 726/1, 27; 713/164; 707/183, 783; 717/127
See application file for complete search history.

(56) References Cited

U.S. PATENT DOCUMENTS

| | | | |
|---|---|---|---|
| 5,701,458 A | 12/1997 | Bsaibes et al. | |
| 6,189,019 B1 | 2/2001 | Blumer et al. | |
| 7,069,437 B2 | 6/2006 | Williams | |
| 7,089,584 B1 * | 8/2006 | Sharma | 726/4 |
| 7,437,718 B2 * | 10/2008 | Fournet et al. | 717/133 |
| 7,475,423 B2 * | 1/2009 | Jooste | 726/4 |
| 7,505,976 B2 * | 3/2009 | Kudo | 1/1 |
| 7,614,085 B2 * | 11/2009 | Ben-Itzhak | 726/25 |
| 7,698,731 B2 * | 4/2010 | Johnson et al. | 726/1 |
| 7,712,143 B2 * | 5/2010 | Comlekoglu | 726/26 |
| 8,108,937 B1 * | 1/2012 | Sallam | 726/27 |
| 8,261,345 B2 * | 9/2012 | Hitomi et al. | 726/22 |
| 2002/0186260 A1 | 12/2002 | Young | |
| 2003/0172109 A1 * | 9/2003 | Dalton et al. | 709/203 |
| 2004/0215950 A1 | 10/2004 | Lindeman | |
| 2005/0149726 A1 * | 7/2005 | Joshi et al. | 713/164 |
| 2005/0240986 A1 * | 10/2005 | Yamamoto et al. | 726/1 |
| 2005/0289150 A1 | 12/2005 | Kudo | |
| 2006/0059539 A1 * | 3/2006 | Shashikumar et al. | 726/1 |
| 2006/0085838 A1 * | 4/2006 | Samuelsson et al. | 726/1 |
| 2006/0236370 A1 * | 10/2006 | John et al. | 726/1 |
| 2008/0016339 A1 | 1/2008 | Shukla | |
| 2008/0109876 A1 * | 5/2008 | Hitomi et al. | 726/2 |
| 2008/0168530 A1 * | 7/2008 | Kuehr-McLaren et al. | 726/1 |
| 2008/0244074 A1 | 10/2008 | Baccas et al. | |
| 2009/0049509 A1 * | 2/2009 | Chan et al. | 726/1 |
| 2009/0125711 A1 | 5/2009 | Schneider | |

\* cited by examiner

*Primary Examiner* — Linglan Edwards
(74) *Attorney, Agent, or Firm* — Lowenstein Sandler LLP (57) ABSTRACT

Application of a local instance of a general security policy is described. In a system with an instance of a program executing in a path container, a security policy applicable the the instance of the program is managed locally for the path container. The path container provides a confined execution environment for the program instance, and the security policy defines permitted operations for the program an all its instances. The instance of the security policy is associated with the path container, which allows the program instance to "see" management within the path container as though with the security policy, while entities having permissions outside the path container "see" the program instance limited to the path container and its associated security policy instance.

21 Claims, 5 Drawing Sheets

MERGING MANDATORY ACCESS CONTROL (MAC) POLICIES IN A SYSTEM WITH MULTIPLE EXECUTION CONTAINERS

RELATED APPLICATIONS

This Application is related to co-pending U.S. patent application Ser. No. 12/324,463, entitled, "Isolating an Execution Container in a System with Mandatory Access Control (MAC)," having common inventorship, and filed concurrently herewith, and to co-pending U.S. patent application Ser. No. 12/324,679, entitled, "Reliably Terminating Processes in a System with Confined Execution Environments," having common inventorship, and filed concurrently herewith.

FIELD

The invention is generally related to mandatory access controls, and more particularly to merging mandatory access control policies in a system with multiple execution containers.

COPYRIGHT NOTICE/PERMISSION

At least a portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright® 2008, Red Hat, Inc., All Rights Reserved.

BACKGROUND

With the increase of security risks to computing devices, and the ubiquity of network connections, many security mechanisms have been developed to try to reduce the threat of computer hacking. One mechanism employed by many operating systems is mandatory access control (MAC) systems. Examples of operating systems that employ MAC or similar techniques are SELinux, SECURE SOLARIS (of Sun Microsystems, Inc., of Santa Clara, Calif.), and WINDOWS VISTA (of Microsoft Corporation of Redmond, Wash.). Note that all copyrights used here and elsewhere herein are used solely for purposes of identification of a product. All marks are the property of their respective owners.

In a MAC system or the equivalent, programs are executed under a security role, or other form of access permission identifier. For each role or group of roles, there are one or more rules that define what programs having the role are allowed to do. The rules can be referred to as permissions, access permissions, security policies, or some other label. The system generally applies the same rules to all programs having the same role. The general applicability of rules to programs of the same role is true even when the programs are executed in separate restricted execution environments. As used herein, an execution environment can refer to a principal or main execution environment, which is the environment provided by the operating system under which all programs on the system execute. Note that differences in terminology may be used. While it is said that the programs execute "under" an operating system, the terminology is essentially interchangeable with other terminology. When focusing on the concepts of control/management in the system, it is typically said that programs run "under" the operating system. When referring to the operating system as an environment that provides services and enables execution of programs, it may be said that programs run "on top of" the operating system, although a program could be said to run or execute under an environment. Either term may be used herein.

In a MAC or similar access control environment, each program instance can be executed in a separate execution environment. Such systems are designed to have security rules apply to an operating system, and thus apply to all instances of programs executing on the operating system environment. The systems are not designed to allow one instance of a program to operate on one set of rules while a sibling instance operates on a different set of rules, but rather that all instances will use the same rules. Operation within the system assumes the use of the same set of security rules by all instances. However, the overlap in applicability of security rules to sibling program instances may allow for less logical separation between the instances than intended. In fact, some MAC environments may not allow the use of separate sub-execution environments to allow execution of multiple program instances because of the lack of separation of the sub-execution environments.

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

In one embodiment, mechanisms for applying a modified instance of a general security policy to a particular path container is described. A system has an instance of a program executing in the path container, where the general security policy is applicable to the the instance of the program. An instance of the general security policy is generated for the specific path container, which allows application of the security policy inside the path container, while separating the path container from other path containers. The program instance inside the path container sees management and application of the security policy as expected and not see anything outside the path container, and entities (e.g., other programs executing on the operating system) that have higher permissions than the program instance can see the limitations of the programs inside the path container. As used herein, reference to a program or process "seeing" something refers to the program being able to have knowledge or awareness of a particular circumstance within a system. The knowledge may come, for example, by performing an operation, making a request, or reading something from storage or memory.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

As mentioned above, a general problem with MAC security schemes is that they define a security policy for an operating system (OS), which prevents running a second instance of the OS's programs in a path container (e.g., via chroot, "change root"). As used herein, a path container refers to a confined environment or confined execution environment, where a process or program operating inside the path container is restricted in what operations can be performed, and what data and services can be accessed. A path container can be considered a type of container, where the instance inside the container is a program, and the container limits the scope of operation of the instance to a particular sub-path of the OS's execution environment (e.g., limited to within a certain sub-directory). As used herein a program may refer to a software application or a software component that executes in support of a software application. A "process" as used herein may refer to a program instance, or may refer to a component of an instance of a program (and thus there may be multiple processes that are part of a single program instance). The processes are identifiable, having an identifier or a label. Such processes may also be referred to as labeled processes. A path container can execute one or more program instances. There may be instances of various different programs chroot refers to an operation within a Unix/Linux environment that changes an apparent root as seen by program instances. Thus, the directory of the path container may be considered "root" for all processes or programs within the path container, but it may be several levels removed from system root, or absolute root. A directory logically above the path container may be referred to as a parent. As used herein, chroot is used as an example of a path container, but will be understood as only an example, and the concept of a path container includes chroot, as well as other mechanisms that can create a path container as described herein.

Typical or exemplary conditions that cause the above-referenced problem include a system design where the operating system can only load a single security policy, and the OS programs inside a chroot need to use the same security contexts inside a chroot as outside, because the security contexts on files are defined in a kernel of the OS. The installation programs are not permitted within the system to put files on disk that have a security context that the kernel does not understand. Additionally, the OS can isolate programs in different security contexts (e.g., different chroots) from each other; however, if the security policies inside the chroot are the same as the security policies on the "main" installation or on the principal environment or absolute root, instances of the same program in and out of the chroot are not protected from each other.

In one embodiment, rather than using the kernel filesystem (e.g., selinuxfs), the filesystem in each chroot is a userspace mount that segregates the security contexts of the chroot from those of the main installation. The userspace mount may be a FUSE (filesystem in userspace) mount. FUSE allows implementation of a fully functional filesystem in a userspace program, by creating a module in the kernel that translates or maps the filesystem calls in the userspace to the actual interfaces in the kernel. In one embodiment, each userspace application of FUSE (such as in each path container or chroot) includes a userspace daemon or module that segregates the security contexts and merges all security contexts into a single security policy that gets loaded into the kernel. Thus, the virtualization of the filesystem can provide a mechanisms to cause each chroot to see itself as root in its execution. The mount acts as a filter or map to the actual filesystem as seen by the OS kernel.

In one embodiment, a security policy has multiple types of security contexts, for example, security contexts and file contexts. File contexts indicate what security rules apply to a file. A security context indicates for a process what ways it can manipulate or operate on processes of the same and/or other security contexts, files of various security contexts, and other system resources. These security contexts may be associated with roles. A program with a particular role has the permission of a corresponding security context.

For example, consider that a process running as unconfined_t can execute an executable file with the security context named_exec_t, resulting in a new process running as bind_t security context. Because file contexts and process contexts are separate from each other, with interactions defined by the security policy, the same set of file contexts in various chroots can be used with different (instances of) security policies and different process contexts. In its simplest form, the security contexts inside a chroot can simply be modified by the name or identifier (ID) of the chroot, which forms a new security policy. The modification could be, for example, prepending (adding a prefix) of the chroot ID, or appending (suffixing) the security contexts with the chroot ID, or otherwise adding the identifier. Prefix and suffix modifications are simple in systems where the security labels exist as strings in a configuration file. For example, consider the following two file security contexts and a transition rule between two process security contexts:

/bin/bash bin_t
/bin/ping ping_exec_t

Often /bin/bash is run in the security context unconfined_t, which is allowed to execute files of the security context ping_exec_t, transitioning the process from unconfined_t context into ping_t context. Consider a chroot called 'chroot1', with the same file contexts as set forth above. Inside the chroot, the shell may be started up in the security context chroot1_unconfined_t, with the execute transitioning rule that if a chroot1_unconfined_t process executes a ping_exec_t file, the process context changes to chroot1_ping_t. Thus, processes from the chroots are isolated from each other, and from the root filesystem. Other implementations of MAC use a combination of tokens, either direct or inherited, that together constitute a security context. In implementations based on a MAC using a combination of tokens, either direct or inherited, tokens can modify the security context to differentiate a chroot ID for an instance of a policy. For example, in a hierarchical MAC system, a security policy or context may inherit from another policy or context, including a token identifying that it is part of a path container to be isolated.

Furthermore, generating a system-wide security policy that covers all of the chroots can be performed automatically, for example by: 1) generating a security context prefix (or other naming convention based on the chroot ID), which can be applied upon creating a chroot; 2) prefixing or, more generically, modifying all process security contexts for a particular chroot with the naming convention modification when processing the security policy for the particular chroot; and, 3) merging the security contexts from all chroots into a single large security policy, which can be loaded into the OS kernel. Note that the merging of the security contexts may be a trivial task when all of the process security contexts have been renamed.

Thus, in one embodiment, role transitioning can be defined in the security policy. If role transitioning is defined in the security policy, the security labels on files do not need to be changed inside the chroot. The process security contexts from the chroots do not intersect with each other in the system (or, as referred to below, in the tree structure environment of the system), because each chroot can have its own security policy. The separation of security policies among the different chroots makes it possible for software inside a chroot to change its security policy and reload the changed security policy applicable to the chroot. When the new security policy is reloaded, the security policy may be intercepted by a system component (for example, a FUSE filesystem daemon) that integrates the chroot security policy into the system-wide security policy as described above.

Figure 1:
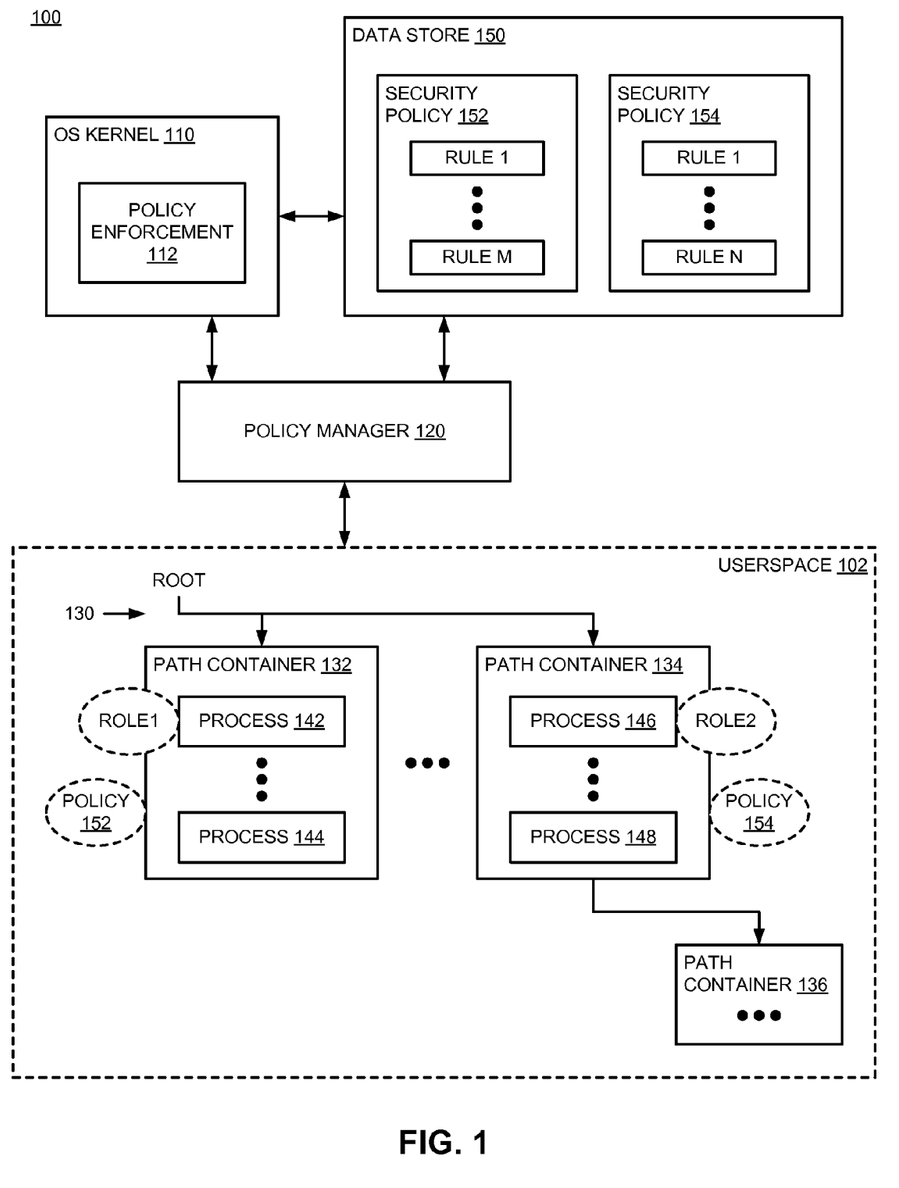
FIG. 1 is a block diagram of an embodiment of a system having an operating system kernel with security policies, and a user space executing multiple path containers.

FIG. 1 is a block diagram of an embodiment of a system having an operating system kernel with security policies, and a user space executing multiple path containers. System 100 represents an example of a computing system environment according to any embodiment described herein. System 100 includes OS kernel 110, which represents a kernel in the operating system of system 100 that executes operations related to system security and/or interaction of processes within system 100.

OS kernel 110 interacts with data store 150, which includes security policies 152 and 154, which represents security policies or access restrictions. Storage 150 is a non-volatile storage, where values and information are retained even when power in system 100 is lost or interrupted, as contrasted to volatile storage such as main memory, which typically loses its value if power is interrupted. Filesystem 114 provides an interface between programs and processes executing in system 100 to access (read and/or write) data to storage 150.

Each policy 152 and 154 includes one or more rules, shown as rule 1 through rule M in security policy 152 and rule 1 through rule N in security policy 154. Note that there is no requirement that all security policies include the same number of rules. Security policies 152 and 154 can be implemented as permission-based mechanisms, or exception-based mechanisms. A permission-based rule is a rule that indicates what is allowed. Implicitly in a permission-based system, whatever is not explicitly allowed may be disallowed. An exception-based system may be the converse, where operations are generally allowed, unless specified otherwise in the rules. MAC systems implemented in Linux platforms are generally permission-based, permitting only what is specifically allowed in the rules, and denying all other operations. Each rule represents a policy for a specific security role within system 100, applicable to processes executing within system 100 that have roles corresponding to the security policies (not shown in FIG. 1).

OS kernel 110 includes policy enforcement module 112, which implements or enforces the rules of the security policies. Thus, when an operation is requested by a process, its permissions can be tested against its corresponding security policy, and the operation permitted or denied based on the rules. OS kernel 110 may operate in conjunction with filesystem 114. Filesystem 114 can be considered to provide a "view" of data to a program. Typically, the operation of filesystem 114 is understood by those skilled in the art as a program requesting an access service of filesystem 114, which then performs the service to provide the requested access.

System 100 also includes policy manager 120, which represents one or more components or modules within system 100 that manages security policies for userspace path containers, such as path containers 132 and 134. In one embodiment, policy manager 120 is implemented as, or includes, a daemon. A daemon is understood as a background process that performs a certain tasks or group of related tasks, and may also be referred to as a "service" in some contexts. In one embodiment, policy manager 120 manages security policies that are customized for particular path containers executing in userspace 102. In one embodiment, policy manager 120 executes in userspace 102, but could also operate in whole or in part with modules in kernel-space. Management of the security policies specific to certain path containers includes segregating security contexts of the path container(s) from the main system (the root environment), and merging individual or individualized security policies into a security policy loaded into OS kernel 110. When referring to a security policy being loaded into a kernel of the OS, it will be understood that the security policy is stored in, for example, main memory, and the address of the security policy is passed to the kernel. Thus, the kernel may know where the security policy is located, and may perform operations with reference to the security policy and its contents.

Additionally, it will be understood that reference herein to a security policy being loaded into the kernel is only an example, and should not be interpreted as limiting. In one embodiment, the policy can be loaded, stored, and enforced outside the kernel, for example, in the userspace. While it may be common in many operating systems for a kernel to implement the policies, not all services are necessarily all run in the kernel-space. For example, certain operating systems exist (such as so-called "micro kernel OS" or "hybrid OS") where some or many services in the system are executed in userspace. While the example of implementing policies is described herein as being performed in the kernel-space, it will be understood that the mechanisms described herein are generally applicable, and could be similarly performed in implementations that provide services in the userspace.

Userspace 102 is an abstraction to illustrate various execution environments in system 100. In one embodiment, userspace 102 includes a tree-based execution environment 130, which has a root environment that may have zero or more sub-environments. The root may be an absolute root, or may be a root within a particular execution environment under which other execution environments may run. In general, processes that are closer to root in tree-based execution environment 130 have higher privileges than those farther down the tree. Processes farther up the tree, closer to root, are generally able to see processes further down the tree. In one embodiment, the root of tree-based execution environment 130 includes various path containers 132, 134, each providing a restricted restricted environment in which one or more processes may be running or executing. As mentioned above, a program may include one or more processes, and in one embodiment, the two terms can be used interchangeably. Path container includes processes 142-144, which path container is shown with processes 146-148. Each path container can additionally have zero or more sub-path containers, such as path container 136 shown as a child to path container 134. The details of path container 136 may be the same in form as path containers 132-134, and no details of path container 136 are shown in the figure.

Each path container allows the restricted execution of its processes, which generally cannot access files, processes, or services outside the security context of their respective path containers. Assume that security policies 152 and 154 represent the only security policies in system 100, and that all programs executing within system 100 are associated with one or the other security policy. In one embodiment, each path container in userspace 102 is provided an individual security policy, which may be based on security policy 152 or 154, depending on which security policy applies to the program. In one embodiment, policy 152 applies to path container 132, and policy 154 applies to path container 134. Each path container or each process within the path containers may have a role, such as Role1 associated with process 142 and Role2 associated with 146. The security policy is modified to specifically identify with the path container of the program, for example, by basing the rules on the identifier of the path container. Policy manager 120 manages the security policies for each of the path containers. In one embodiment, policy manager 120 is not a single entity, but includes a module executing associated with each path container in userspace 102. Policy manager 120 aggregates the various security policies as a single policy for OS kernel 110.

Note that there is depicted a data store, which represents a memory or storage device in which various items may be stored. In the description of the remainder of the figures, security policies may be depicted as being "within" a kernel, or a policy manager. It will be understood that such depictions are representative, and values representing the security policies are stored somewhere in physical memory, and are "loaded" or known to the kernel or the policy manager. Thus, for simplicity in depicting and describing the concepts herein, the remainder of the description does not explicitly show the data store or the physical location of the components stored in storage/memory devices.

Figure 2:
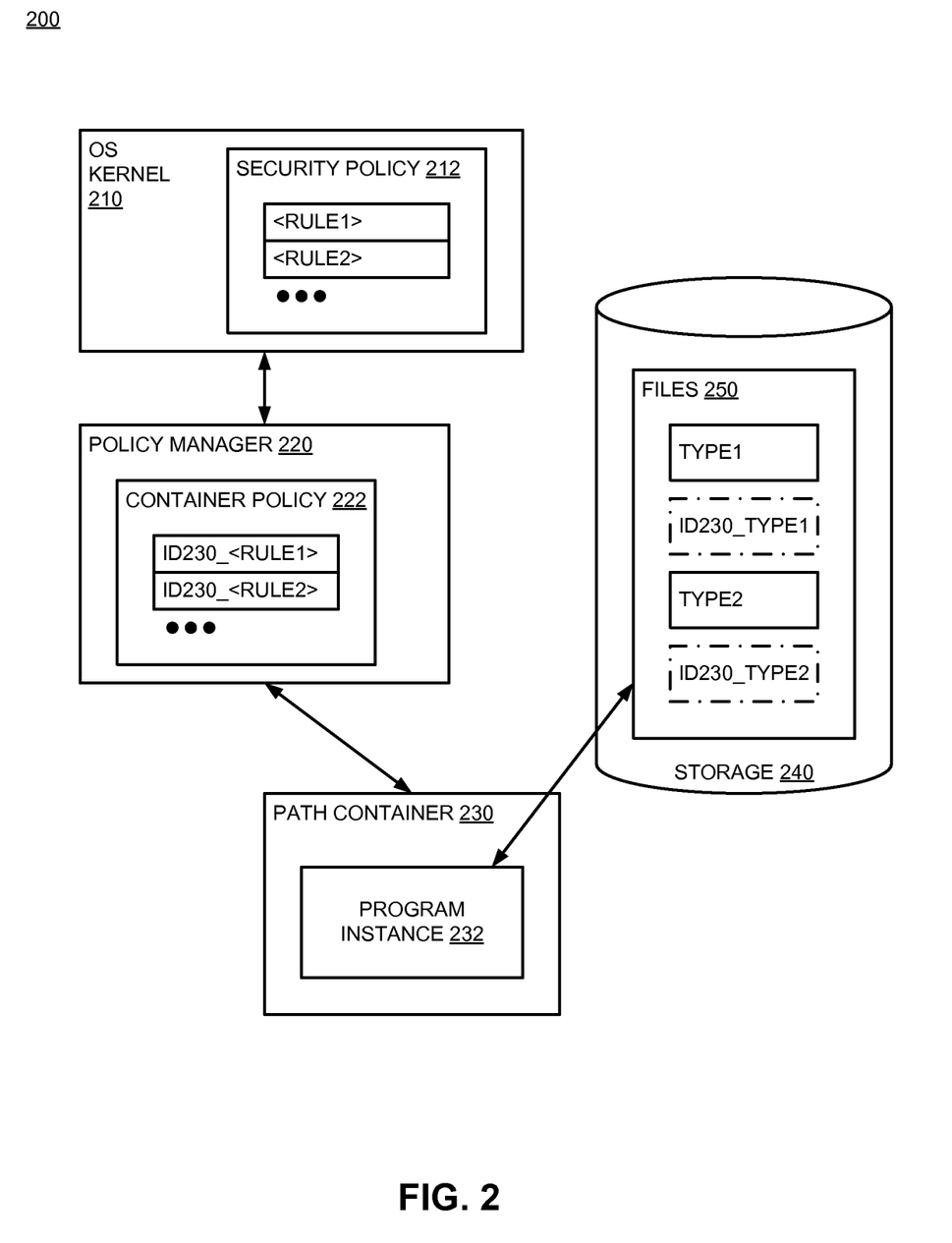
FIG. 2 is a block diagram of an embodiment of a system that applies a security policy locally to a particular path container.

FIG. 2 is a block diagram of an embodiment of a system that applies a security policy locally to a particular path container. System 200 represents an example of a computing system environment according to any embodiment described herein. System 200 includes OS kernel 210, which represents a kernel in the operating system of system 200 that executes operations related to system security and/or interaction of processes within system 200. OS kernel 210 includes security policy 212, which represents a system-level security policy, having one or more rules. The rules in security policy 212 are represented as being of the form <rule1> and <rule2>.

System 200 also includes path container 230, which is a path container or constrained execution environment in which program instance 232 executes or runs. Policy manager 220 includes container policy 222, which includes various rules. Container policy 222 is an instance of security policy 212, and is specifically associated with path container 230. Assuming for this example that the identifier of path container 230 is 'ID230', the rules in container policy 222 are designated of the form ID230<rule1> and ID230<rule2>, which represents the rule modified by the identifier for its associated path container. Thus, each rule applies to path container 230. Application of the rules in container policy 222 affects program instance of path container 230, but would not affect, for example, a program inside a separate path container (not shown).

Storage 240 represents a non-volatile storage where data and files are stored within system 200. Storage 240 is technically not generally accessible directly by program instance 232, but is only accessible via a filesystem on the OS. However, for the purpose of simplicity, program instance 232 is shown as able to access storage 240, with the technicalities of the access assumed to be understood by those skilled in the art. In general, the access of storage 240 by program instance 232 would be limited by container policy 222, and specifically whatever limitations imposed by the rules within the policy.

A simplified representation illustrates some of the properties of the application of (path) container-specific rules or policy to program instance 232. Files 250 represent files within system 200, as managed by a filesystem (not shown). Assume that various files of different types are accessible to processes having access permissions based on an associated security policy. For security policy 212, files 250 of Type1 and Type 2 may correspond to access permissions associated with Rule1 and Rule2 of security policy 212. For container policy 222, files of Type1 and Type2 may not be accessible; rather, files of type ID430_Type1 and ID430_Type2 may be the corresponding files. The modified file types may be considered to be a separate filesystem for the path container. The path container would see its associated files as 'Type1' and 'Type2' through the application of mapping/translation by policy manager 220 and the OS filesystem (not shown).

Consider the following example illustrating a security policy modification. A path container (e.g., path container 230) has the identifier 'CONT0001', which may correspond to 'ID230'. The path container executes a program (e.g., program instance 232) that has an associated security policy (e.g., security policy 212) that specifies as security rules: 1) programs running as role httpd_r can read files of type httpd_data_t; and, 2) programs running as role httpd_r can write to files of type httpd_log_t. Because the security policy is applicable to the program executing within the path container, the security rules illustrate the security configuration that should exist inside the path container. An instance of the security policy is generated for the particular path container.

The instance of the security policy (e.g., container policy 222) is generated with the following modifications to the security rules: 1) programs running as role CONT0001_httpd_r can read files of type CONT0001_httpd_data_t; and, 2) programs running as role CONT0001_httpd_r can write to files of type CONT0001_httpd_log_t. The files can still be stored on disk as httpd_log_t files, but when read into the system, they are prefixed with the container ID (CONT0001) or otherwise identified as being associated with the path container (e.g., suffixing the container ID onto the file names). Thus, a comparison of security type to the security rules will show a match, while the rules are being applied specifically to a path container.

The prefix is based on the container ID of the program trying to access the file. One possible enhancement is to specify the security type prefix as a per-filesystem option at mount time. Processes in path containers have their security role changed to reflect the path container identifier. The changing of the security role is performed in a manner that is not visible to userspace programs running inside the path container. Thus, a program running under the 'CONT0001_httpd_r' security role will be seen as 'httpd_r' to programs in the same path container. Programs not running in the same path container that are able to see inside the path container will still see the full security role (CONT0001_httpd_r). Thus, the security rules inside the path container look just like normal security rules. They are simply manipulated at runtime to help isolate the path containers from each other.

Figure 3:
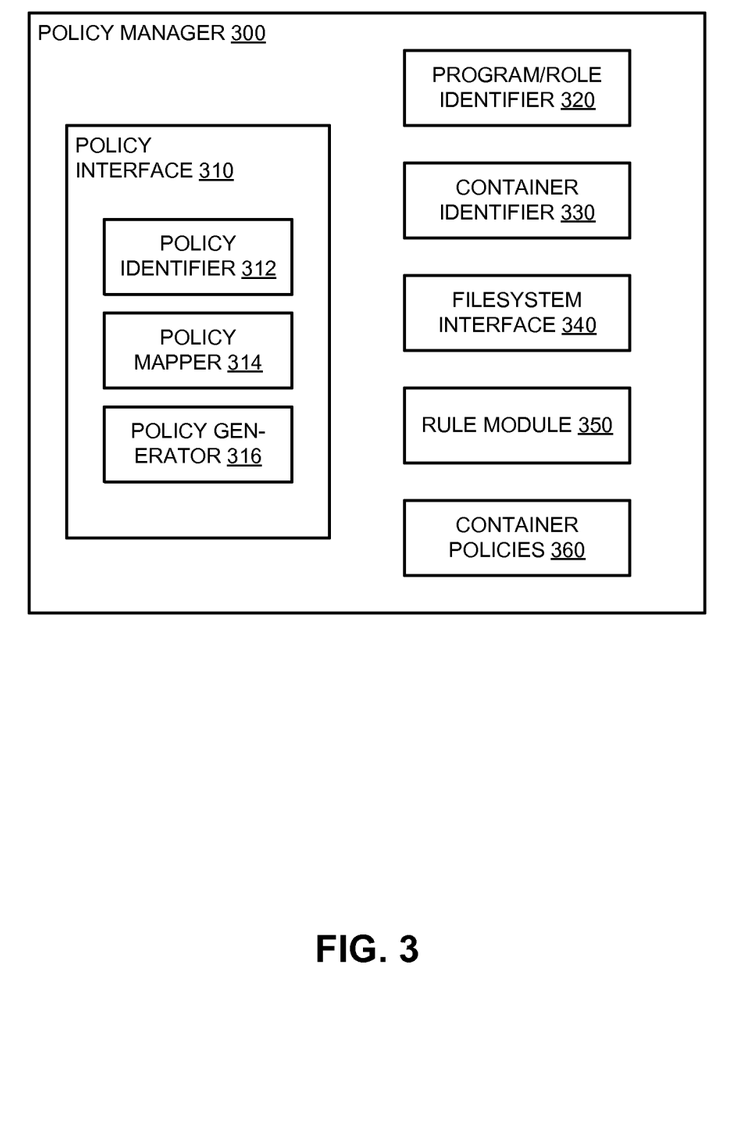
FIG. 3 is a block diagram of an embodiment of a policy manager that manages security policies for path containers.

FIG. 3 is a block diagram of an embodiment of a policy manager that manages security policies for path containers. Policy manager 300 represents a policy manager according to any embodiment described herein. In general, policy manager 300 manages individual security policies as applied to particular path containers within a computing system (a host system). In one embodiment, policy manager 300 creates policies individual to target path containers. Policy manager 300 may include kernel-level interfaces and userspace interfaces. The components of policy manager 300 are intended as examples, and are not to be understood as limiting. A policy manager could be implemented with more, fewer, and/or different components than those shown. The components may exist as standard commands or operations within an execution environment, or they could be customized modules, or a combination of both.

Policy manager 300 includes policy interface 310 that interfaces the policy manager with the security policies in the host system. The policies that are interfaced include the general or system-level policies from which policies are created for individual path containers, as well as the policies for the individual path containers. Policy interface 310 includes policy identifier 312, which enables policy manager 300 to identify or determine what policy applies to a program. A program has an associated policy based on the type of the program, the security context of the program, or other attributed associated with the program, depending on the implementation. Policy interface 312 can read or obtain the information that indicates the policy, and match it to the security policies at the system level. A security policy specific to a path container is generated from the system-level security policies. The policy specific to a path container can then be applied to each program and process running in the path container.

Policy interface 310 includes policy mapper 314, which enables policy manager 300 to associate policies specific to particular path containers to system-level security policies. Thus, policies are applied consistently throughout the system as required by typical MAC-based systems, but allows logical separation of the security policies. The logical separation of the policies allows the path containers to be separate from each other, even if the same system-level security policy applies to each path container.

Policy interface 310 includes policy generator 316, which enables policy manager 300 to create and modify copies of system-level security policies. Thus, policy manager 300 can generate a policy and associate it with a path container. Alternatively, the system kernel could generate the policies. Policy manager 300 would generally associate the copies of the policies with specific path containers.

Policy manager also includes program/role identifier 320, which enables policy manager 300 to identify one or more programs or processes within a particular path container and identify a role associated with the identified path container. The role indicates what policy is applicable to the path container, and may be used by policy interface 310 to identify the applicable policy.

Policy manager 300 also includes container identifier 330, which enables policy manager 300 to identify a path container. Each path container includes an identifier (ID), which indicates the execution environment. In one embodiment, the path container ID may be available only to processes having a higher security context, or a process further up the tree of execution environment, from the path container.

Policy manager 300 includes filesystem interface 340, which represents one or more mechanisms through which policy manager 300 can access the system-level filesystem to access data and files for execution. In one embodiment, the path containers are or create part of a filesystem having specific paths related to the path containers. Filesystem interface 340 enables policy manager 300 to manage the access of each path container to its localized filesystem path. Note that each path container may have rules associated with it that can be designated, along with particular processes within the path container, by the path container ID. As far as the processes within the path container are concerned, they operate on root, and can read and write to system-level portions of the filesystem. However, the restrictions of the rules specific to the path containers may actually prevent such access to the processes of the path containers.

Thus, filesystem interface 340 maps or translates the requests of the processes within a path container to the corresponding path in the actual, system-level filesystem, rather than the filesystem path as seen by the processes of the path container. For example, instead of accessing files in a security context <context>, the path containers may execute as though they are accessing files in <context>, and will see <context> from within their path containers, but they may actually be accessing files in the security context <context_path_container>, with the path container ID appended to the context. <context_path_container> can be stored and managed separately on the system-level filesystem from a security context <context_path_container2>. Both path containers would see <context> from the interfacing of policy manager 300.

In one embodiment, policy manager 300 includes rule module 350. Rule module 350 may be any of a number mechanisms. In one embodiment, rule module 350 enables policy manager 300 to create policies specific to the path container, for example, by creating an instance of an applicable system-level policy, and modifying the rules based on the path container ID. The policy may be applied to the path container either by simply modifying the rules based on the path container ID, or by the saving of the specific policy in the policy manager. The policy manager may include a mapping or association table, or some other mechanism to indicate what policy is associated with what path container. In one embodiment, rule module 350 enables policy manager 300 to create a temporary rule in a system-level policy or a specific policy to restrict one or more operations within a target path container.

In one embodiment, specific policies for each path container are stored at the policy manager. Thus, policy manager 300 may include container policies 360. Whether created by administrative interaction with the host system of policy manager 300, or whether policy manager 300 creates the specific policies, they may be stored locally for management. Policies may also be stored externally to policy manager 300, which can be accessed through, for example, policy interface 310.

Figure 4:
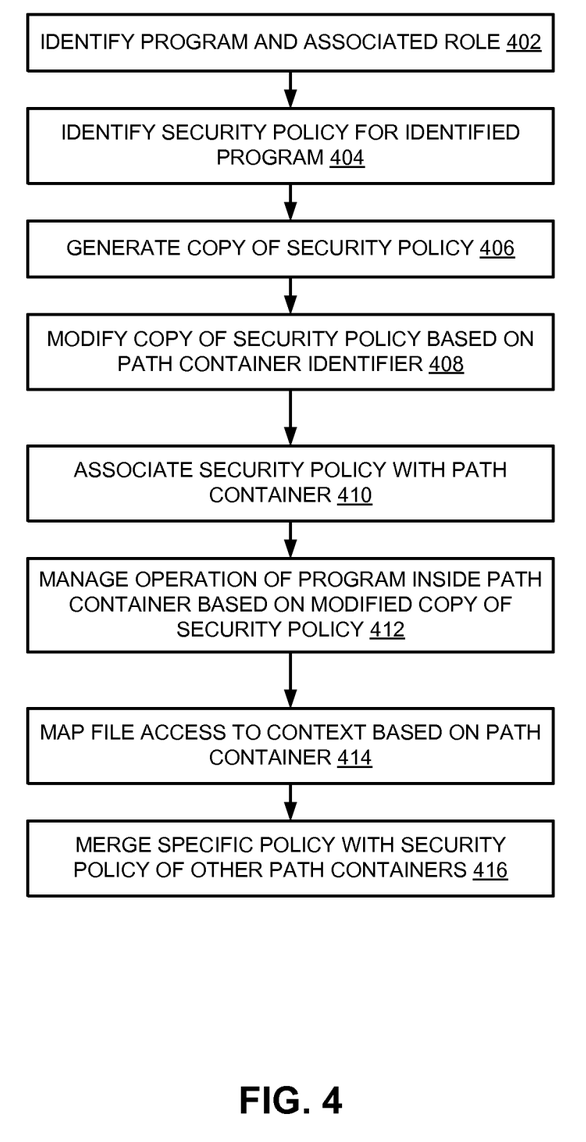
FIG. 4 is a flow diagram of an embodiment of a process for applying a security policy locally to a particular path container.

FIG. 4 is a flow diagram of an embodiment of a process for applying a security policy locally to a particular path container. The method or process may be performed by processing logic that may include hardware (e.g., circuitry, programmable logic, microcode, etc.), software (such as instructions run on a processing device), or a combination thereof.

A policy manager (e.g., 120, 220, 300) identifies a program (e.g., 142) and associated role (e.g., Role1) for the program, 402. Alternatively, an OS kernel (e.g., 110, 210) could identify the program and/or the role. The policy manager or kernel identifies a security policy (e.g., 152, 222) for the identified program, 404. The policy manager or kernel generates an instance of the security policy, 406, and modifies the instance (e.g., 222) based on a path container identifier associated with a path container (e.g., 132, 134, 230) in which the identified program executes.

The policy manager or kernel associates the security policy with the path container, 410. The policy manager then manages operation of the program inside the path container based on the modified instance of the security policy, 412. The policy manager maps file access (e.g., 310, 250) to a proper context based on the path container, 414. The policy manager merges path container specific policies with security policies of other path containers, 416.

Figure 5:
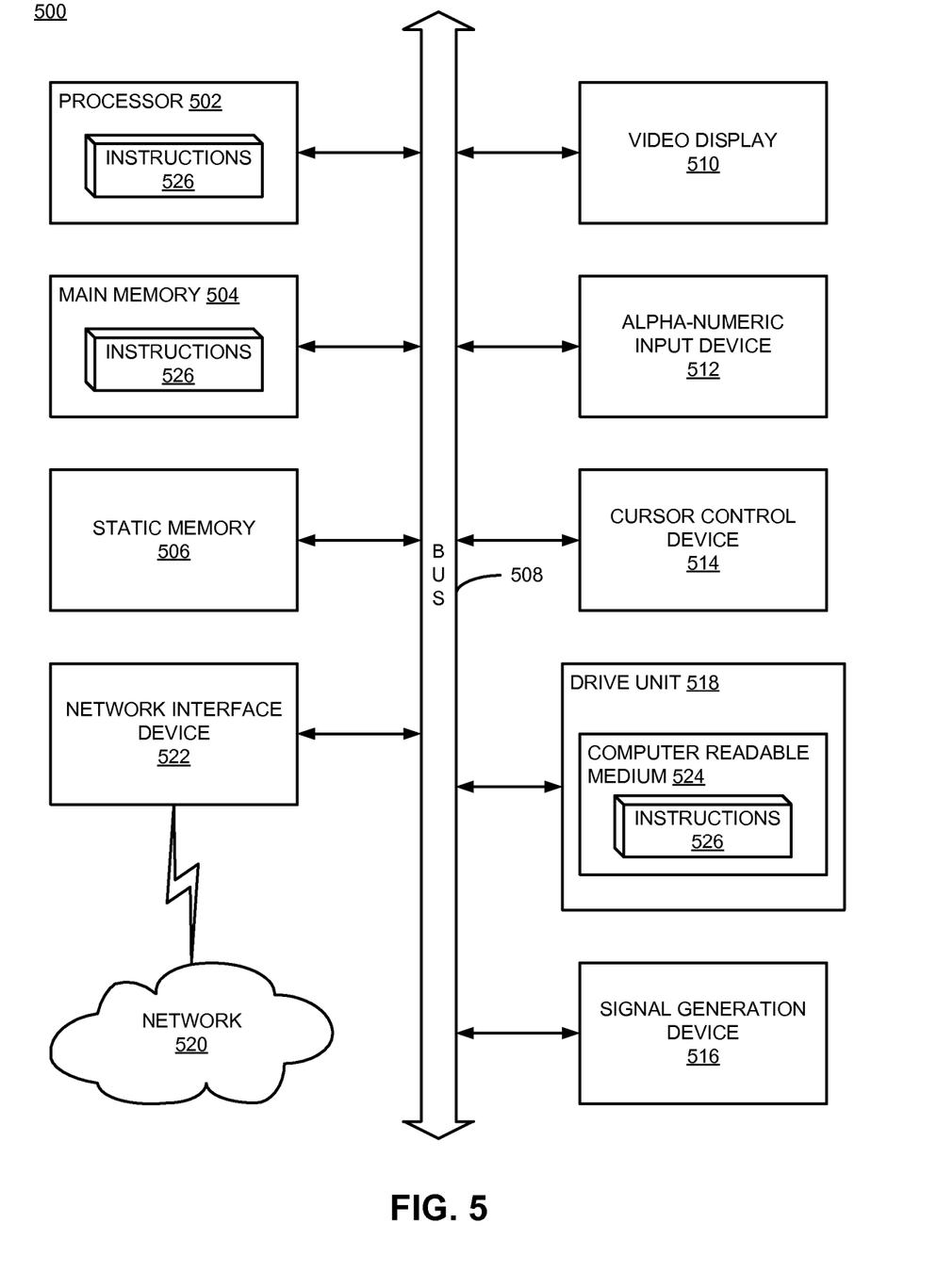
FIG. 5 is a block diagram of a computing device on which embodiments of the invention may be implemented.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 522 for performing the operations and steps discussed herein.

The computer system 500 may further include a network interface device 526. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 524 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 526.

While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   identifying, by a processor, a security policy for an instance of a program executing in a path container, wherein the path container has a path container identifier and provides a confined execution environment for the instance of the program within a tree structure execution environment having a corresponding tree structure directory, and wherein the security policy is a system-wide security policy that defines permitted operations for all instances of the program within the tree structure execution environment;
   generating, by the processor, a modified instance of the system-wide security policy to generate a container-specific security policy for the path container;
   applying, by the processor, the container-specific security policy within the path container to separate security of the path container from other path containers within the tree structure execution environment;
   managing operation of the instance of the program within the path container based on the container-specific security policy, wherein the container-specific security policy prevents the instance of the program from having visibility into circumstances outside of the path container; and
   managing operation of another program outside of the path container and within the tree structure execution environment, wherein the other program has higher permissions that allow the other program to have visibility into circumstances inside the path container.

2. The method of claim 1, wherein identifying the security policy for the instance of the program in the path container comprises identifying the security policy for the instance of the program executing under a chroot.

3. The method of claim 1, wherein identifying the security policy further comprises:
   identifying a role of the instance of the program based on an operation of the program and a use of resources of the program; and
   identifying a security policy associated with the role.

4. The method of claim 1, wherein applying the instance of the security policy with the path container comprises modifying rules in the security policy based on the path container identifier.

5. The method of claim 4, wherein modifying the rules based on the path container identifier comprises adding the path container identifier to security contexts identified in the rules.

6. The method of claim 1, wherein applying the container-specific security policy within the path container comprises associating a token identifying the path container with the security policy.

7. The method of claim 1, wherein managing operation of the instance of the program based on the container-specific security policy comprises merging the container-specific security policy with other container-specific security policies to generate a combined security policy.

8. A non-transitory machine-readable storage medium having content stored thereon to provide instructions to cause a machine to perform operations including:
   identifying a security policy for an instance of a program executing in a path container, wherein the path container has a path container identifier and provides a confined execution environment for the instance of the program within a tree structure execution environment having a corresponding tree structure directory, and wherein the security policy is a system-wide security policy that defines permitted operations for all instances of the program within the tree structure execution environment;
   generating a modified instance of the system-wide security policy to generate a container-specific security policy for the path container;
   applying the container-specific security policy within the path container to separate security of the path container from other path containers within the tree structure execution environment;
   managing operation of the instance of the program within the path container based on the container-specific security policy, wherein the container-specific security policy prevents the instance of the program from having visibility into circumstances outside of the path container; and
   managing operation of another program outside of the path container and within the tree structure execution environment, wherein the other program has higher permissions that allow the other program to have visibility into circumstances inside the path container.

9. The non-transitory machine-readable storage medium of claim 8, wherein the content for identifying the security policy for the instance of the program in the path container comprises content for identifying the security policy for an instance of the program executing under a chroot.

10. The non-transitory machine-readable storage medium of claim 8, wherein the content for identifying the security policy further comprises content for identifying a role of the instance of the program based on an operation of the program and a use of resources of the program; and identifying a security policy associated with the role.

11. The non-transitory machine-readable storage medium of claim 8, wherein the content for applying the container-specific security policy within the path container comprises content for modifying rules in the security policy based on the path container identifier.

12. The non-transitory machine-readable storage medium of claim 11, wherein the content for modifying the rules based on the path container identifier comprises content for adding the path container identifier onto security contexts identified in the rules.

13. The non-transitory machine-readable storage medium of claim 8, wherein the content for applying the container-specific security policy within the path container comprises content for associating a token identifying the path container with the security policy.

14. The non-transitory machine-readable storage medium of claim 8, wherein the content for managing operation of the instance of the program based on the container-specific security policy comprises content for merging the container-specific security policy with other container-specific security policies to generate a combined security policy.

15. A computer system comprising:
a data storage device to store a security policy for an instance of a program that executes in a path container, wherein the security policy is a system-wide security policy that defines permitted operations for all instances of the program executing within the computer system, and wherein the path container has a path container identifier and provides a confined execution environment for the instance of the program within a tree structure execution environment having a corresponding tree structure directory; and
a processor, coupled to the data storage device, to execute a policy manager to identify the security policy as corresponding to the instance of the program, generate a modified instance of the system-wide security policy to generate a container-specific security policy for the path container, apply the container-specific security policy within the path container to separate security of the path container from other path containers within the tree structure execution environment, store the instance of the associated instance of the security policy in the data storage device, and manage operation of the instance of the program within the path container based on the container-specific security policy, wherein the container-specific security policy is to prevent the instance of the program from having visibility into circumstances outside of the path container, wherein the policy manager is to manage operation of another program outside of the path container and within the tree structure execution environment, wherein the other program has higher permissions that allow the other program to have visibility into circumstances inside the path container.

16. The computer system of claim 15, the policy manager to identify the security policy for the instance of the program executing under a chroot.

17. The computer system of claim 15, the policy manager to identify a role of the instance of the program based on an operation of the program and a use of resources of the program, and identify a security policy associated with the role.

18. The computer system of claim 15, the policy manager to further modify rules in the security policy based on the path container identifier.

19. The computer system of claim 18, the policy manager to append the path container identifier onto security contexts identified in the rules.

20. The computer system of claim 15, the policy manager to further associate a token identifying the path container with the security policy.

21. The computer system of claim 15, the policy manager to merge the container-specific security policy with other container-specific security policies to generate a combined security policy.

* * * * *